(12) United States Patent
Gorokhov et al.

(10) Patent No.: US 8,295,250 B2
(45) Date of Patent: Oct. 23, 2012

(54) CODE INTERLEAVING FOR A STRUCTURED CODE

(75) Inventors: Alexei Y. Gorokhov, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 11/781,723

(22) Filed: Jul. 23, 2007

(65) Prior Publication Data

US 2008/0019425 A1    Jan. 24, 2008

Related U.S. Application Data

(60) Provisional application No. 60/833,176, filed on Jul. 24, 2006.

(51) Int. Cl.
   *H04B 7/216* (2006.01)

(52) U.S. Cl. ........................................................ 370/335

(58) Field of Classification Search .................. 370/320, 370/335, 330, 342; 455/69; 375/145; 711/157; 714/758; 380/37
See application file for complete search history.

(56) References Cited

U.S. PATENT DOCUMENTS

| | | | | |
|---|---|---|---|---|
| 5,872,774 | A * | 2/1999 | Wheatley et al. | 370/335 |
| 5,909,494 | A * | 6/1999 | Blaze | 380/37 |
| 6,483,828 | B1 * | 11/2002 | Balachandran et al. | 370/342 |
| 6,636,723 | B1 * | 10/2003 | Kitagawa et al. | 455/69 |
| 2003/0012171 | A1 | 1/2003 | Schmidl et al. | |
| 2004/0028004 | A1 * | 2/2004 | Hayashi et al. | 370/320 |
| 2004/0066838 | A1 | 4/2004 | Choi et al. | |
| 2004/0208321 | A1 * | 10/2004 | Wary | 380/268 |
| 2004/0223536 | A1 * | 11/2004 | Schilling | 375/145 |
| 2005/0059353 | A1 | 3/2005 | Smith et al. | |
| 2007/0067696 | A1 * | 3/2007 | Bhatt et al. | 714/758 |
| 2008/0107087 | A1 * | 5/2008 | Kwon et al. | 370/335 |
| 2008/0215831 | A1 * | 9/2008 | Argon et al. | 711/157 |
| 2008/0219211 | A1 * | 9/2008 | Franceschini et al. | 370/330 |

FOREIGN PATENT DOCUMENTS

| | | |
|---|---|---|
| EP | 1463242 | 9/2004 |
| JP | 09018450 | 1/1997 |
| RU | 2252484 | 5/2005 |
| WO | WO9859473 | 12/1998 |
| WO | WO9912274 A1 | 3/1999 |

(Continued)

OTHER PUBLICATIONS

International Search Report—PCT/US07/074267, International Search Authority—European Patent Office—May 12, 2007.

(Continued)

*Primary Examiner* — Albert T Chou
(74) *Attorney, Agent, or Firm* — Donald C. Kordich

(57) ABSTRACT

Communication systems and methods that mitigate false alarms due to Doppler shift are disclosed. Received message data is mapped to orthogonal Walsh codes, interleaved and scrambled with appropriate PN sequence prior to transmission. The transmitted message data is descrambled and deinterleaved upon reception. The energies associated with each of the Walsh code from various antennas and/or signal paths are combined to obtain a total energy for each Walsh code. If the total energy of the Walsh code exceeds a certain threshold it is declared as the received message else an erasure is indicated. As the data is interleaved prior to transmission, any phase ramp introduced due to Doppler is transformed into random phase errors upon deinterleaving at the receiver thereby mitigating false alarms.

36 Claims, 10 Drawing Sheets

FOREIGN PATENT DOCUMENTS

| WO | 9930433 | 6/1999 |
|---|---|---|
| WO | WO0064073 | 10/2000 |
| WO | 0077963 | 12/2000 |
| WO | 03105356 | 12/2003 |

OTHER PUBLICATIONS

Kanivichaporn, N, et al.: "Chip Interleaved CDMA2000 With Space Time Block Code" Vehicular Technology Conference, 2004. VTC 2004—Spring. 2004 IEEE 59th Milan, Italy May 17-19, 2004. Piscataway, NJ, USA, IEEE, US, May 17, 2004, p. 1044-1048, XP010766070 ISBN: 0-7803-8255-2.

Garg. D et al: "Combined Effect of Chip Interleaving and Frequency Domain Equalization for DS-CDMA" Vehicular Technology Conference, 2004. VTC 2004-Spring. 2004 IEEE 59th Milan, Italy May 17-19, 2004, Piscataway, NJ, USA, IEEE, US, May 17, 2004, p. 435-439vol. 1, XP010764835 ISBN: 0-7803-8255-2.

Written Opinion—PCT/US2007/074267, International Search Authority, European Patent Office, May 12, 2007.

Langton, "Intuitive Guide to Principles of Communications," CDMA Tutorial, www.complextoreal.com, 2002, pp. 1-18.

* cited by examiner

CODE INTERLEAVING FOR A STRUCTURED CODE

CROSS-REFERENCE TO RELATED APPLICATION(S)

This application claims the benefit of U.S. Provisional Patent Application Ser. No. 60/833,176 filed on Jul. 24, 2006 and entitled "CODE INTERLEAVING FOR STRUCTURED CODE", the entirety of which is incorporated herein by reference.

BACKGROUND OF THE INVENTION

Code Division Multiple Access (CDMA) is a modulation and multiple access scheme that uses wideband spread spectrum techniques for signal transmission as opposed to narrowband channel techniques used in conventional analog systems. Accordingly, information contained in a transmission is spread over a very large bandwidth hence facilitating multiple users to share the same frequency band at the same time. This involves applying a code to data bits that specifically identify information belonging to a particular call (user) in a specific geographic location so that only the same code can read it at the receiver end. Thus, data bits for all users in a particular geographic cell, generally reachable by a local transceiver station, are simultaneously transmitted across the wide spectrum. A user's device picks up the signals and discards all the coded bits except for those specifically targeted to it. It then strips off the code and restores the transmission to its original data stream. Spread spectrum technique thus causes data to occupy more bandwidth than necessary by modulating a data signal with a spreading signal that uses more bandwidth than the data signal. Bits of spreading signal are called chips. Therefore, CDMA promotes privacy and security, as picking up a signal that is spread out over the spectrum requires knowledge of a code to separate one call from another as opposed to signals concentrated into narrow bands which are easier to monitor with radio receivers.

Each user in a CDMA communication system can be identified in various ways. Orthogonal multiple access is one such technique wherein a user is assigned one of the many orthogonal waveforms derived from an orthogonal code. Two signals are orthogonal if their cross-correlation is zero for a null time shift. Cross correlation is a general measure of the extent to which the two different signals, each shifted in time with respect to the other, correlate as a function of that time shift. Therefore, the orthogonal signals/waveforms assigned to different users transmitted at the same time will not interfere with each other.

An example for a set of orthogonal code is the Walsh set. Walsh functions are generated using an iterative process of constructing a Hadamard matrix starting with $H_1=[0]$. Walsh functions are thus used for two purposes in CDMA. In a base station-to-mobile terminal forward link, they are utilized for creating independent transmission channels. In the reverse link from a mobile terminal to the base station, they are used for orthogonal modulation. However, a message signal processed via orthogonal Walsh sequences, is susceptible to false alarms wherein a time-shifted version of a transmitted Walsh sequence is erroneously identified as the transmitted data as well as channel decorrelation leading to performance degradation.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

A communication system in accordance with embodiment described herein provides for a transmitter comprising a channelizer/spreader, a code interleaver and a scrambler. The channelizer provides spread data by processing a received data with a channelization code. The code interleaver reorders the data received from the channelizer and provides the interleaved data to the scrambler. The scrambler scrambles the interleaved data with PN sequences and transmits the scrambled signal.

Another embodiment relates to a receiver operable to be used with the transmitter described above. The receiver comprises a descrambler, a deinterleaver, a dechannalizer/despreader and a combiner. The descrambler receives the scrambled input from the transmitter and multiplies it with the PN sequence used to scramble the input and provides the descrambled input. A chip deinterleaver deinterleaves the output from the descrambler in a manner complimentary to the interleaving performed during transmission. The deinterleaved chips are then provided to a dechannelizer/despreader that provides despread symbols. A combiner combines despread symbols from multiple fingers or receive antennas to provide detected data.

In accordance with another aspect, the message within the communication system is spread with orthogonal Walsh codes. Accordingly, another embodiment comprises a transmitter wherein a Walsh mapper maps the message data comprising K bits to a specific Walsh code of length $L=2^K$. A code interleaver interleaves the L chips of the Walsh code. A scrambler multiplies the interleaved chips with chips of a PN sequence and provides scrambled chips for transmission.

In accordance with another aspect a receiver operable to read messages from the transmitter described above comprises a descrambler, a deinterleaver, an FHT unit, a combiner and a message detector. The descrambler descrambles the message received from the transmitter and provides it to the deinterleaver. The deinterleaver deinterleaves the message bits and provides them to an FHT (Fast Hadamard Transform) unit. The FHT unit despreads the deinterleaved chips and provides an energy for each Walsh code. The combiner combines energies for each of the Walsh codes for various antennas/signal paths. A message detector identifies the Walsh code with the largest energy as the transmitted message.

Another aspect relates to a method of communication which provides for spreading data by processing a received data with a channelization code. The spread data is then reordered to provide interleaved data for scrambling. The interleaved data is then scrambled with PN sequences and transmitted. As the spread data is interleaved prior to transmission any phase ramp caused by Doppler due to movement of the transmitted is scattered within the interleaved chips thus breaking the structure that results in higher false alarms.

Another aspect relates to a method of reception to obtain the data transmitted in accordance with the transmission method described supra. The method involves receiving scrambled input and multiplying it with the PN sequence used to scramble the input to obtain the descrambled input. The descrambled chips are then deinterleaved in a manner complimentary to the interleaving performed during transmission. The deinterleaved chips are then despread to obtain the despread symbols. The despread symbols from multiple fingers or receive antennas are then combined to provide detected data.

In accordance with another aspect, the message within the communication system is spread with orthogonal Walsh codes. Accordingly, another embodiment comprises a method of transmission wherein message data comprising K bits is mapped to a specific Walsh code of length $L=2^K$. The L chips of the Walsh code are then interleaved. The interleaved chips are then scrambled with chips of a PN sequence and subsequently transmitted.

Another aspect relates to a method of receiving and processing signals to obtain messages mapped to a Walsh code and transmitted as described above. The data received is initially descrambled and deinterleaved. The deinterleaved message bits are then despread. The despread Walsh codes are provided with an energy value that reflects the likelihood of the Walsh code being the transmitted Walsh code. The energies for each of the Walsh codes for various antennas/signal paths are combined. The Walsh code with the largest energy is identified and declared as the transmitted message if it exceeds a certain threshold else an erasure is indicated.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DESCRIPTION OF THE INVENTION

Figure 1:
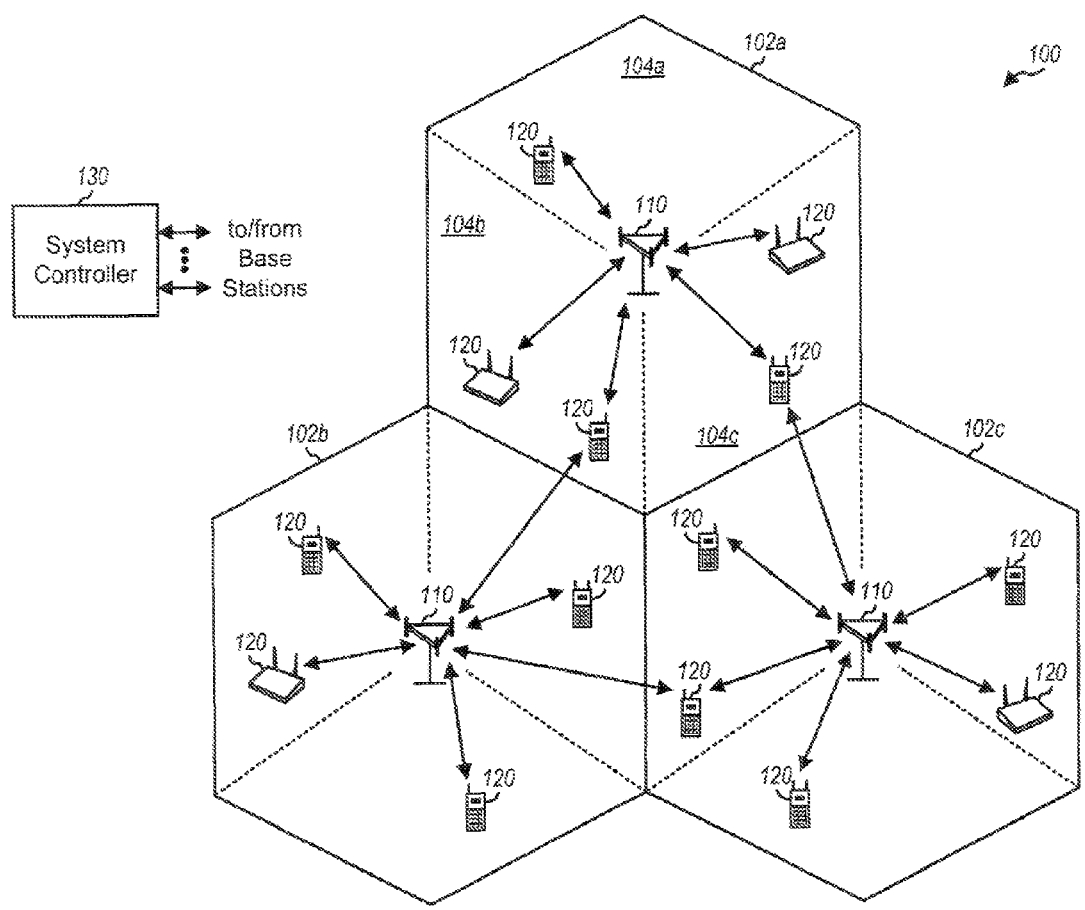
FIG. 1 illustrates a wireless multiple-access communication system in accordance with various aspects set forth herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface. Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips ... ), optical disks (e.g., compact disk (CD), digital versatile disk (DVD) ... ), smart cards, and flash memory devices (e.g., card, stick, key drive ... ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Each base station 110 and terminal 120 in system 100 may have one or more antennas to facilitate communication with one or more base stations 110 and/or terminals 120 in system 100. In one example, a base station 110 can simultaneously transmit multiple data streams for broadcast, multicast, and/or unicast services, wherein a data stream is a stream of data that can be of independent reception interest to a terminal 120. A terminal 120 within the coverage area of a base station 110 can then receive one or more of the data streams transmitted from the base station 110. By way of non-limiting example, a base station 110 may be an access point, a Node B, and/or another appropriate network entity. Each base station 110 provides communication coverage for a particular geographic area 102. As used herein and generally in the art, the term "cell" can refer to a base station 110 and/or its coverage area 102 depending on the context in which the term is used. To improve system capacity, the coverage area 102 corresponding to a base station 110 may be partitioned into multiple smaller areas (e.g., areas 104a, 104b, and 104c). Each of the smaller areas 104a, 104b, and 104c may be served by a respective base transceiver subsystem (BTS, not shown). As used herein and generally in the art, the term "sector" can refer to a BTS and/or its coverage area depending on the context in which the term is used. In a cell 102 having multiple sectors 104, the BTSs for all sectors 104 of the cell 102 can be co-located within the base station 110 for the cell 102.

In another example, the system 100 can utilize a centralized architecture by employing a system controller 130 that can be coupled to one or more base stations 110 and provide coordination and control for the base stations 110. In accordance with alternative aspects, system controller 130 may be a single network entity or a collection of network entities. Additionally, the system 100 may utilize a distributed architecture to allow the base stations 110 to communicate with each other as needed. In accordance with one aspect, terminals 120 may be dispersed throughout the system 100. Each terminal 120 may be stationary or mobile. By way of non-limiting example, a terminal 120 may be an access terminal (AT), a mobile station, user equipment, a subscriber station, and/or another appropriate network entity. A terminal may be a wireless device, a cellular phone, a personal digital assistant (PDA), a wireless modem, a handheld device, and so on. In one example, a terminal 120 can transmit data to a base station 110 or to another terminal 120.

In accordance with another aspect, system 100 can generate transmission resources in the form of channels. By way of non-limiting example, these channels can be generated via one or more of code division multiplexing (CDM), frequency division multiplexing (FDM), and time division multiplexing (TDM). Orthogonal frequency division multiplexing (OFDM), a variant of FDM, may be used to effectively partition the overall bandwidth of system 100 into multiple orthogonal subcarriers, which can then be modulated with data. These subcarriers may also be referred to as tones, bins, and frequency channels. Alternatively, in a time division based technique, each subcarrier can comprise a portion of sequential time slices or time slots. Each terminal 120 may be provided with one or more time slot/subcarrier combinations for transmitting and receiving information in a defined burst period or frame. A time division technique may also utilize a symbol rate hopping scheme and/or a block hopping scheme.

In another example, a code division based technique can facilitate the transmission of data over a number of frequencies available at any time in a range. Data can be digitized and spread over available bandwidth of system 100 such that multiple terminals 120 can be overlaid on the channel and respective terminals 120 can be assigned a unique sequence code. Terminals 120 can then transmit in the same wide-band chunk of spectrum, wherein a signal corresponding to each terminal 120 is spread over the entire bandwidth by its respective unique spreading code. In one example, this technique can provide for sharing, wherein one or more terminals 120 can concurrently transmit and receive. Such sharing can be achieved, for example, through spread spectrum digital modulation, wherein a stream of bits corresponding to a terminal 120 is encoded and spread across a very wide channel in a pseudo-random fashion. A base station 110 can then recognize the unique sequence code associated with a terminal 120 and undo the randomization in order to collect the bits for the particular terminal 120 in a coherent manner.

In another example, system 100 may utilize one or more multiple-access schemes, such as CDMA, TDMA, FDMA, OFDMA, Single-Carrier FDMA (SC-FDMA), and/or other suitable multiple-access schemes. OFDMA utilizes Orthogonal Frequency Division Multiplexing (OFDM), and SC-FDMA utilizes Single-Carrier Frequency Division Multiplexing (SC-FDM). Additionally, system 100 may utilize a combination of multiple-access schemes, such as OFDMA and CDMA. Additionally, system 100 may utilize various framing structures to indicate the manner in which data and signaling are sent on forward and reverse links. System 100 may further utilize one or more schedulers (not shown) to assign bandwidth and other system resources. In one example, a scheduler may be employed at one or more of a base station 110, a terminal 120, and a system controller 130.

Figure 2:
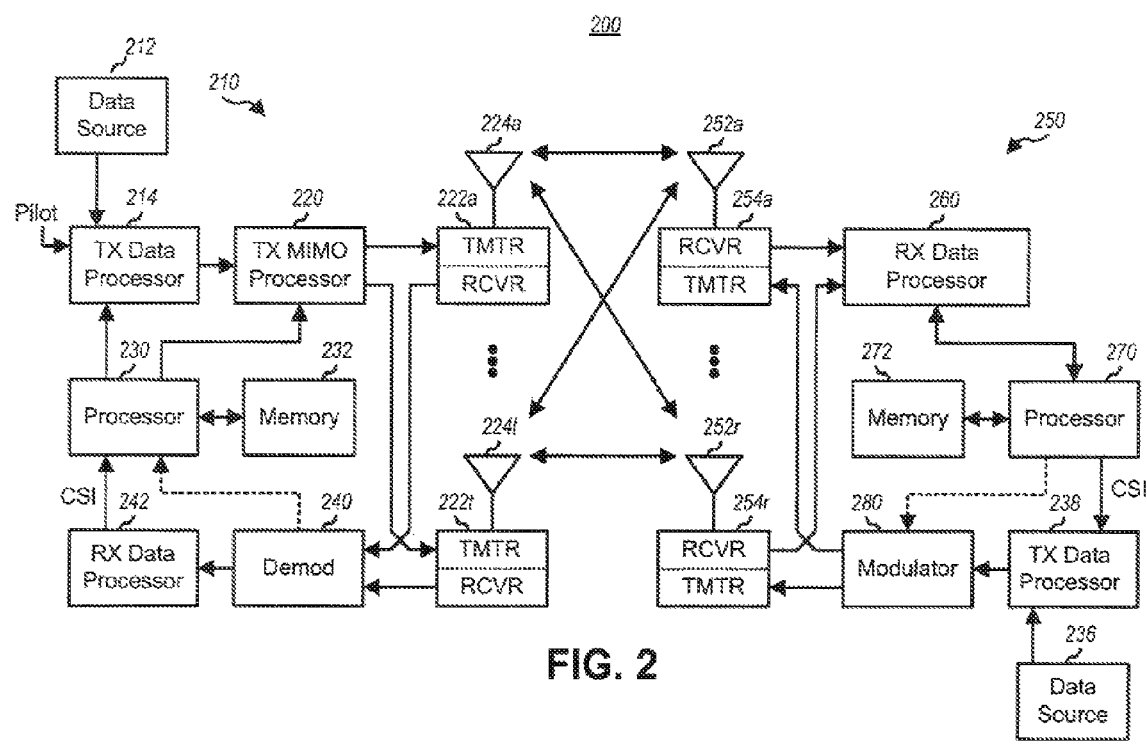
FIG. 2 is a block diagram of a communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

The advantage of spread spectrum technique for personal communications is its ability to accommodate multiple users simultaneously on the same frequency. As mentioned earlier, orthogonal multiple access is one way to distinguish users within a CDMA communication system which operates on the spread spectrum technique. Since waveforms assigned to different users are orthogonal, users with different codes do not interfere with each other. An example set of orthogonal waveforms are Walsh codes/functions based on Hadamard matrices. However, processing a data signal from a moving mobile station via orthogonal Walsh codes renders it susceptible to false alarms as well as performance degradation. This is because the Doppler shift caused by the motion of the mobile station, introduces a phase ramp into the message signal processed via a Walsh sequence resulting in a non-negligible correlation with another Walsh sequence. This leads to increasing false alarms as well as performance degradation due to such channel de-correlation across the CDMA segment. Various systems and methods described herein are directed towards enhancing the functionality of CDMA communication systems by understanding and thereby mitigating the effects of Doppler shift.

Figure 3A:
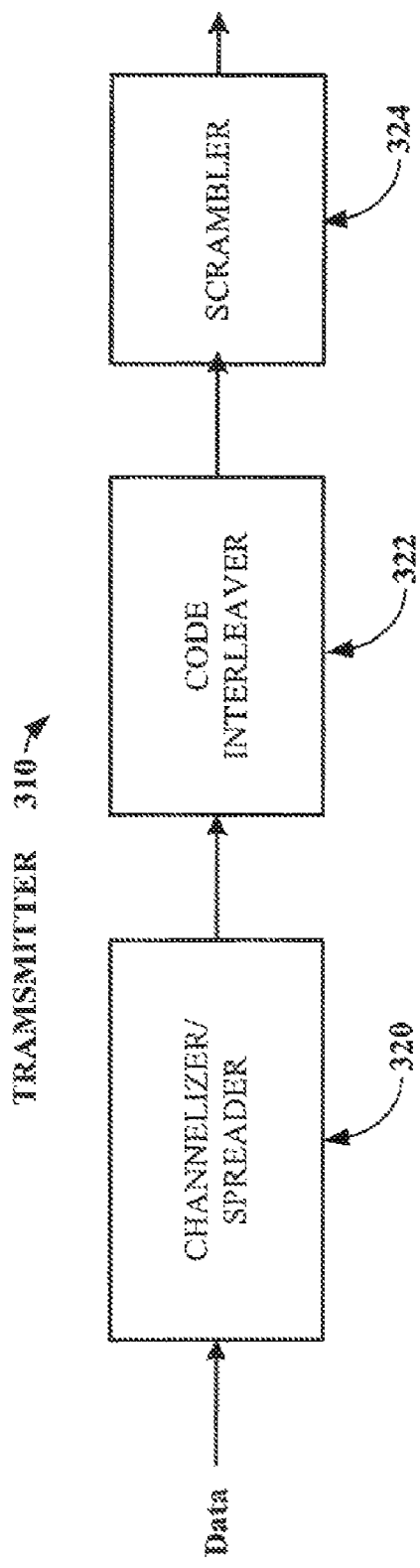
FIG. 3A shows a block diagram of an embodiment of a transmitter with code interleaving.

Spread Spectrum is a means of transmission where the data is made to occupy a larger bandwidth than necessary by modulating it with a spreading signal which uses more bandwidth than the data signal. Bandwidth spreading is accomplished before the transmission through the use of a channelization code which is independent of the transmitted data. The same code is used to demodulate the data at the receiving end. Accordingly, FIG. 3A shows a block diagram of an embodiment of a transmitter 310 with code interleaving. A channelizer/spreader 320 receives data to be transmitted, spreads the data with a channelization code, and provides the spread data. The data to be transmitted can be traffic data, control data, pilot data, and/or some other type of data. The channelization code can be a Walsh code, an orthogonal variable spreading factor code (OVSF), or some other code. The spreading can be achieved by (1) replicating a modulation symbol for data to obtain L replicated symbols and (2) multiplying the L replicated symbols with L chips of the channelization code to generate L chips for the modulation symbol. A code interleaver 322 reorders the L chips for the modulation symbol in a pseudo-random or structured manner and provides L interleaved chips for the modulation symbol. The interleaving is performed across the length of the channelization code. A scrambler 324 multiplies the interleaved chips with a PN sequence and provides scrambled chips. The scrambled chips are further processed (not shown in FIG. 3A) and transmitted to a receiver.

Figure 3B:
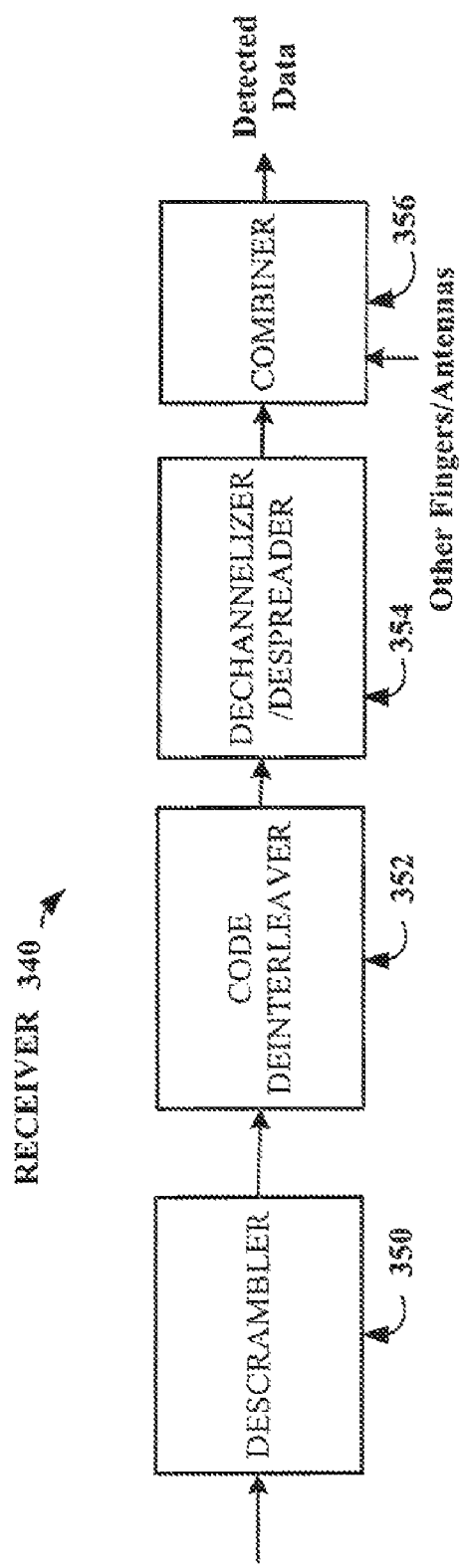
FIG. 3B shows a block diagram of a receiver that can be used for decoding data transmitted in accordance with an aspect.

FIG. 3B shows a block diagram of an embodiment of a receiver 340 that can be used for transmitter 310 in FIG. 3A. A descrambler 350 multiplies received input samples with the PN sequence used by transmitter 310 and provides descrambled samples. A chip deinterleaver 352 deinterleaves the descrambled samples in a manner complementary to the interleaving performed by code interleaver 322 at transmitter 310 and provides deinterleaved samples. The deinterleaving is performed across the length of the channelization code. A dechannelizer/despreader 354 despreads the deinterleaved samples and provides despread symbols. The despreading may be achieved by (1) multiplying L deinterleaved samples for a modulation symbol with the L chips of the channelization code and (2) accumulating L resultant samples to obtain a despread symbol. A combiner 356 can combine despread symbols from multiple fingers and/or receive antennas and provide final despread symbols, which are referred to a detected data.

CDMA combines two different spreading sequences to create unique channels that convey information regarding a user as well as the geographic cell where the user is located. Examples of these spreading sequences are Pseudo-random noise (PN) sequences. PN sequences are known sequences which exhibit noise-like behavior or characteristics of random sequences. They address the necessity within the communication systems for privacy by providing codes which can only be read by the intended user and appear like noise to other users. They are generated by using shift registers, modulo-2 adders (XOR gates) or feedback loops. The maximum length of a PN sequence is determined by the length of the register or the configuration of the feedback network. An N bits register can take up to $2^N$ different combinations of zeros and ones. Disregarding a sequence wherein the input comprises entirely of zeros producing zero output, the maximum length of any PN sequence will be $2^N-1$.

Different PN sequences may be used to distinguish messages for different control channels (e.g., of the same user), different users, and/or different sections/base stations. The PN sequences utilized in this embodiment can be a function of a control channel used to send the message, a user identifier for the user or mobile terminal/station sending or receiving the message (long/inner PN sequence), a sector identifier for a base station receiving or sending the message (short/outer PN sequence) and/or other parameters. These PN sequences may be generated from a base station transmission modulator which generates signals spread by outer PN codes as well as inner orthogonal codes. For example, the inner orthogonal codes can be Walsh codes generated by Hadamard-Walsh functions. The PN scrambling also ensures low correlation between time-shifted versions of different Walsh codes, so as to mitigate false alarms wherein a time-shifted version of one Walsh code is falsely detected as another Walsh code. This is beneficial since Walsh codes generally have poor cross-correlation properties in the presence of time shift to delay spread in a wireless channel. The PN scrambling thus reduces the probability of false alarm in the presence of delay spread.

Figure 4A:
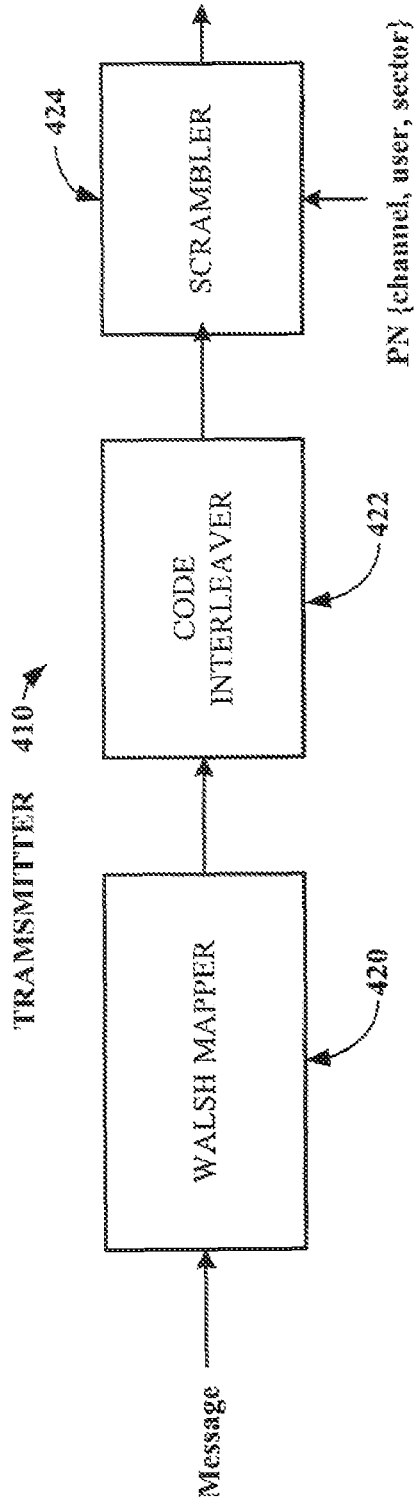
FIG. 4A depicts a block diagram an embodiment of a transmitter in accordance with an aspect.

FIG. 4A depicts a block diagram an embodiment of a transmitter 410 that transmits a message. The transmitter 410 can be part of a base station for a forward link (or downlink) or a part of a mobile terminal for reverse link (or uplink) transmission. At transmitter 410, a Walsh mapper 420 receives a message composed of K information bits and maps the message to a specific Walsh code with a length of $L=2^K$. In an embodiment where K is equal to 10, the length of the Walsh code L that encodes the message would be $2^{10}$ which is equal to 1024. In this embodiment, a 10-bit message has one of the 1024 possible values, which can be associated with 1024 different Walsh codes each of length 1024. Walsh mapper 420 then maps the 10-bit message to a specific 1024-chip Walsh code determined by the message value. Upon mapping the K-bit message to a specific L-chip Walsh code, a code interleaver 422, similar to the one discussed earlier, then interleaves (or reorders) the L chips of the Walsh code from the mapper 420 and provides L interleaved chips. Scrambler 424 receives the interleaved chips from inter leaver 422, multiplies the interleaved chips with the chips of a PN (Pseudo-random noise) sequence and provides scrambled chips. The scrambled chips are further processed (not shown) to form a composite waveform which is modulated onto a sinusoidal carrier, bandpass filtered, translated to the desired operating frequency, amplified and radiated.

Figure 4B:
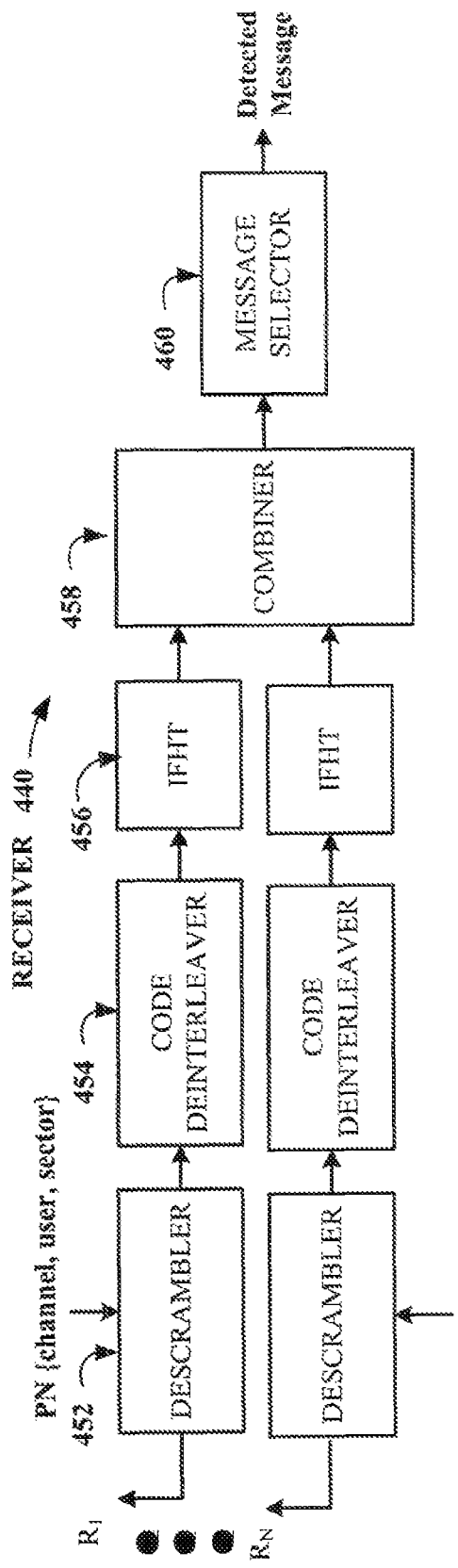
FIG. 4B is a block diagram of a receiver that can decode messages in accordance with an aspect.

FIG. 4B shows a block diagram of an embodiment of a receiver 440 that can be used with the transmitter 410 of FIG. 4A for communications. Receiver 440 can be part of a terminal for forward link transmission or a part of a base station for reverse link transmission. Receiver 440 comprises multiple fingers or receive antennas $R_1, R_2, \ldots RN$. Within a single receive antenna $R_1$, a descrambler 452 receives input samples and the PN sequence, and provides descrambled samples. A chip deinterleaver 454 deinterleaves (or reorders) the descrambled samples in a manner complementary to the interleaving performed by code interleaver 422 at transmitter 410 and provides the delinterleaved samples. An inverse fast Hadamard transform (FHT) unit 456 despreads the deinterleaved samples with each of the L different Walsh codes and provides an energy for each Walsh code. The processing for a given Walsh code can comprise (1) multiplying the deinterleaved samples with the L chips of the Walsh code, (2) accumulating L resultant chips to obtain a despread symbol, and (3) computing the energy of the despread symbol. As stated supra, the L Walsh codes are orthogonal to one another and in the absence of noise and other deleterious channel effects, the energy of the Walsh code provided by Walsh mapper 420 would be high, and the energies for the L−1 other Walsh codes would be low or (ideally) zero.

Each set of units 452, 454 and 456 perform processing for one received signal instance from one receive antenna. The signal sent by transmitter 410 can reach receiver via multiple signal paths, e.g., line-of-sight path and/or reflected paths resulting from obstructions in the wireless environment. A signal at receiver 450 may thus include multiple received signal instances for different signal paths. Each received signal instance of sufficient strength can be processed by a finger processor (or simply, a finger) composed of units 452, 454 and 456 to obtain energies for L Walsh codes. Receiver 440 may also receive the signal sent by transmitter 410 via multiple receive antennas $R_1, R_2, \ldots R_N$. The input samples from each receive antenna are processed by a set of fingers to obtain energies for the L Walsh codes for the particular receive antenna. A combiner 458 can sum the energies from all fingers and/or receive antennas for each Walsh code and provide a total energy for the Walsh code. Combiner 458 also scales the energies (e.g., based on SNRs (signal-to-noise ratio) or signal strengths of the fingers) prior to summing. It also selects the largest energy for each Walsh code from among the energies for that Walsh code for different fingers and/or receives antennas. Combiner 458 can also combine signals from different fingers in other manners. Regardless of the method adopted, combining is performed for each Walsh code across fingers and/or receive antennas.

A message selector 460 identifies the Walsh code with the largest energy and compares this energy against a threshold. Selector 460 provides (1) the K bits corresponding to the Walsh code with the largest energy as the detected message if the energy exceeds the threshold or (4) an erasure indication. Erasure occurs when data frames are discarded due to transmission errors. The threshold can be set to achieve a desired false alarm rate or probability. A low threshold increases the likelihood of a wrong Walsh code being declared and results in a higher false alarm probability. Conversely, a high threshold can cause a failure to identify a transmitted message. The erasure rate is then a function of target false alarm rate and received signal quality.

Alternate embodiments (not shown) of the transmitters 310, 410 or the receivers 340, 440 may not include the respective interleavers or deinterleavers. In the absence of the interleaver within a transmitter, for example 410, the Walsh mapper inputs the L-chip orthogonal (Walsh) code to the scrambler to multiply it with L-chips of a PN sequence before transmitting the L scrambled chips of the message. Similarly, in the absence of the deinterleaver within the receiver, the FHT units despread the descrambled samples as opposed to deinterleaved samples with each of L different orthogonal (Walsh) codes and provide an energy for each code. Such embodiments perform well under many channel conditions. However, their performance degrades in the presence of high Doppler, which can be caused by a moving transmitter and/or moving receiver. Doppler causes a phase ramp in the input samples which disturbs the orthogonal property of the codes thereby increasing false alarm probability.

The potential degradation in performance due to high Doppler is illustrated by data from Table 1.

TABLE 1

| Common Parameters | Control Modulation | Mobile speed [km/h] | Erasure rate | Error rate |
|---|---|---|---|---|
| 2 GHz band 5bits/channel | w/o Walsh interleaving | 120 | ≈38% | <0.1% |
| 30channels per 128 tones | w/o Walsh interleaving | 350 | ≈55% | <6.6% |
| Veh A profile f-factor = 0.6 CoT = −12 dB RoT = 6 dB | w/ Walsh interleaving | 350 | ≈61% | <0.1% |

As seen from the table above, if the transmitter or receiver moves at 350 kilometers/hour (km/hr), then a Doppler shift of about 650 Hertz (Hz) is observed at a carrier frequency of 2 giga-hertz (GHz). If a message/Walsh code is transmitted in 0.911 milliseconds (ms), then a phase ramp of approximately 0.6 of a full cycle (or $0.6 \times 2\pi$) is present in the input samples across the Walsh code length. For example, if Walsh code zero sent is for the message, it can be expressed as:

Code 0:  + + + + + + + + + + + + + + + ... + + + + + + + + + + + + + ... + + +

Another Walsh code, e.g., Walsh code 1, may be evaluated by the receiver and can be expressed as:

Code 1:  + + + + + + + + + + + + + + + ... + + + − − − − − − − − − − − ... − − −

In the absence of Doppler, the two Walsh codes are orthogonal to one another. Application of a phase ramp to Walsh code 0, due to Doppler, results in a waveform corresponding to a phase modified Walsh code 0. There will be non-negligible correlation between this waveform and Walsh code 1. This correlation results in a higher false alarm probability, e.g., a higher likelihood of Walsh code 1 being declared as the transmitted Walsh code instead of Walsh code 0. The PN scrambling alone by the scrambler does not combat this problem since both Doppler and scrambling are multiplicative. Thus, the phase ramp remains after descrambling at the receiver.

In contrast, including a code interleaver within the transmitters 310/410 causes code interleaving in a pseudo-random manner or a structured manner. In an embodiment of pseudo-random interleaving, the L Walsh chips are written to L pseudo-randomly selected chip locations of a buffer and are read out sequentially. A pseudo-random interleaver can be obtained by performing an exhaustive search to find an interleaver that provides the lowest cross-correlation in the presence of phase ramp. In an embodiment of structured interleaving, the L Walsh chips are re-ordered with bit-reversed interleaver. With the bit-reversed interleaver, the L Walsh chips are written to chip locations in a buffer such that the location/address of a Walsh chip is obtained as an integer whose binary representative is a bit-reversed version of the binary representative of the order of that Walsh chip. The Walsh chips are read from the buffer in linear order. As an example of bit-reversal interleaving, an original sequence of 8 Walsh chips may be give as $[S_0, S_1, S_2, S_3, S_4, S_5, S_6, S_7]$, and the interleaved sequence can be given as $[S_0, S_4, S_2, S_6, S_1, S_5, S_3, S_7]$. A normal bit-reversal interleaver can be used when the sequence length (L) is a power of two. Some known structured interleavers, for example pruned bit reversed interleavers, may not solve the problem when associated with some orthogonal codes like Walsh codes, while a pseudo-random (Feistel) interleaver always works. As stated supra, regardless of the methodology adopted, the interleaving is performed across the Walsh code length.

In the embodiments shown in FIGS. 3A-B and 4A-B, the code interleaving is performed prior to the scrambling at the transmitter, and the chip deinterleaving is performed after the descrambling at the receiver. In other embodiments, the code interleaving is performed after scrambling at the transmitter and the chip deinterleaving is performed prior to the descrambling at the receiver. In general, the code interleaving can be performed at any point after the Walsh mapping at the transmitter, and the chip deinterleaving can be performed at any point prior to processing the signal via an FHT at the receiver.

Code interleaving and deinterleaving can be used to combat high Doppler and other deleterious channel effects. If high Doppler introduces a phase ramp in the input samples at the receiver, then the chip deinterleaving results in the phase ramp being shuffled to produce a sequence of shuffled phase shifts. After the descrambling and chip deinterleaving the receiver will observe a waveform corresponding to the transmitted Walsh chips multiplied by the sequence of shuffled phase shifts. The interleaving can be designed such that the sequence of shuffled phase shifts appears like a sequence of pseudo-random phase errors. In this case, the correlation of the waveform observed by the receiver with any of the non-transmitted Walsh code should be fairly low. The false alarm performance would thus not degrade due to high Doppler.

FIGS. 3A through 4B show embodiments for applying code interleaving to waveforms that make use of structure codes. A structured code is a code having a particular structure as opposed to a PN-like code composed of pseudo-random chips. Some examples of structured codes include Walsh codes, OVSF codes, orthogonal codes, bi-orthogonal codes, quasi-orthogonal functions (e.g., in cdma2000), polyphase sequences having a flat envelop and flat frequency response, and so on. A structured code may operate on data (e.g., as shown in FIGS. 3A and 3B) or represent data (e.g., as shown in FIGS. 4A and 4B). Scrambling can also be performed as described above or may be omitted. Code interleaving can be applied in manners other than those described supra to waveforms that make use of structured codes.

Figure 5A:
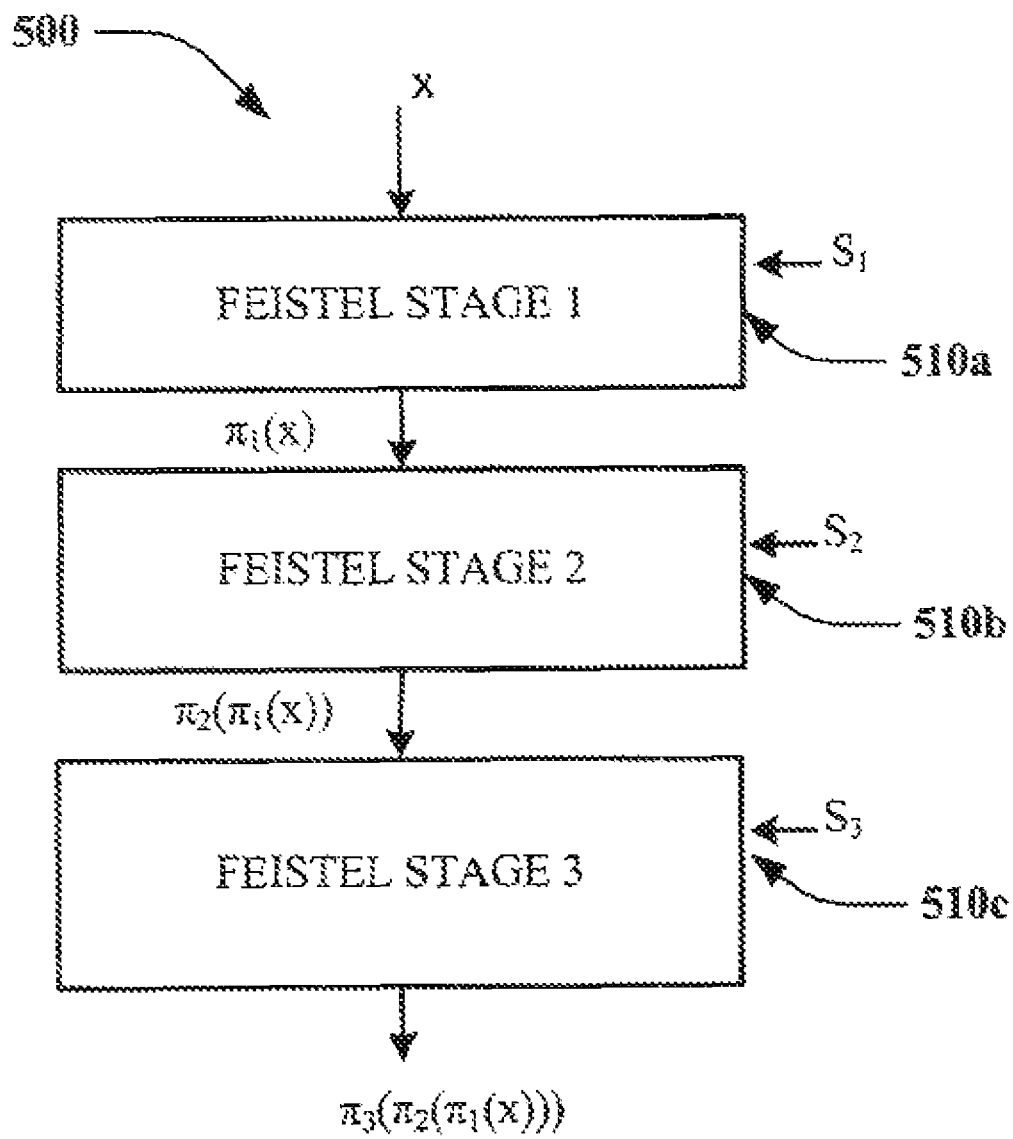
FIG. 5A shows an embodiment of a three-stage Feistel network that generates pseudo-random permutations of sizes that are powers of 2.

FIG. 5A shows an embodiment of a three-stage Feistel network 500 that generates pseudo-random permutations of sizes that are powers of 2. Feistel network 500 can be used for code interleaver 322 in FIG. 3A and code interleaver 422 in FIG. 4A. Feistel network 500 includes a first stage 510a, a second stage 510b, and a third stage 510c. Feistel network 500 generates a permutation $\pi(x)$ of $\{0, 1, 2, \ldots 2^n-2, 2n-1\}$ and operates as follows:

1. An n-bit input x is split into two parts, L and R, with each part containing roughly the same number of bits. If n is even, then L comprises the n/2 most significant bits (MSBs) of x, and R comprises the n/2 least significant bits (LSBs) of x. If n is odd, the L comprises the (n−1)/2 MSBs of x and R comprises the (n+1)/2 LSBs of x.

2. The output $\pi_1(x)$ of first stage 510a of Feistel network 500 is an n-bit quantity of the form (R, L⊕f(R)). Here $f(R) = (R+S_1) \mod 2^{\lceil L \rceil}$ where |L| is the number of bits in L, $S_1$ is an |L| bit seed, and ⊕ denotes a bit-by-bit XOR operation.

3. The output $\pi_1(x)$ is fed to second stage 510b of Feistel network 500, which is identical to first stage 510a except that the seed used is $S_2$. The output $\pi_2(\pi_1(x))$ of second stage 510b is fed to the third stage 510c, which is identical to the first two stages, except that the seed used is $S_3$. The output $\pi_3(\pi_2(\pi_1(x)))$ of third stage 510c is the final output $\pi(x)$ of the Feistel network 500.

Figure 5B:
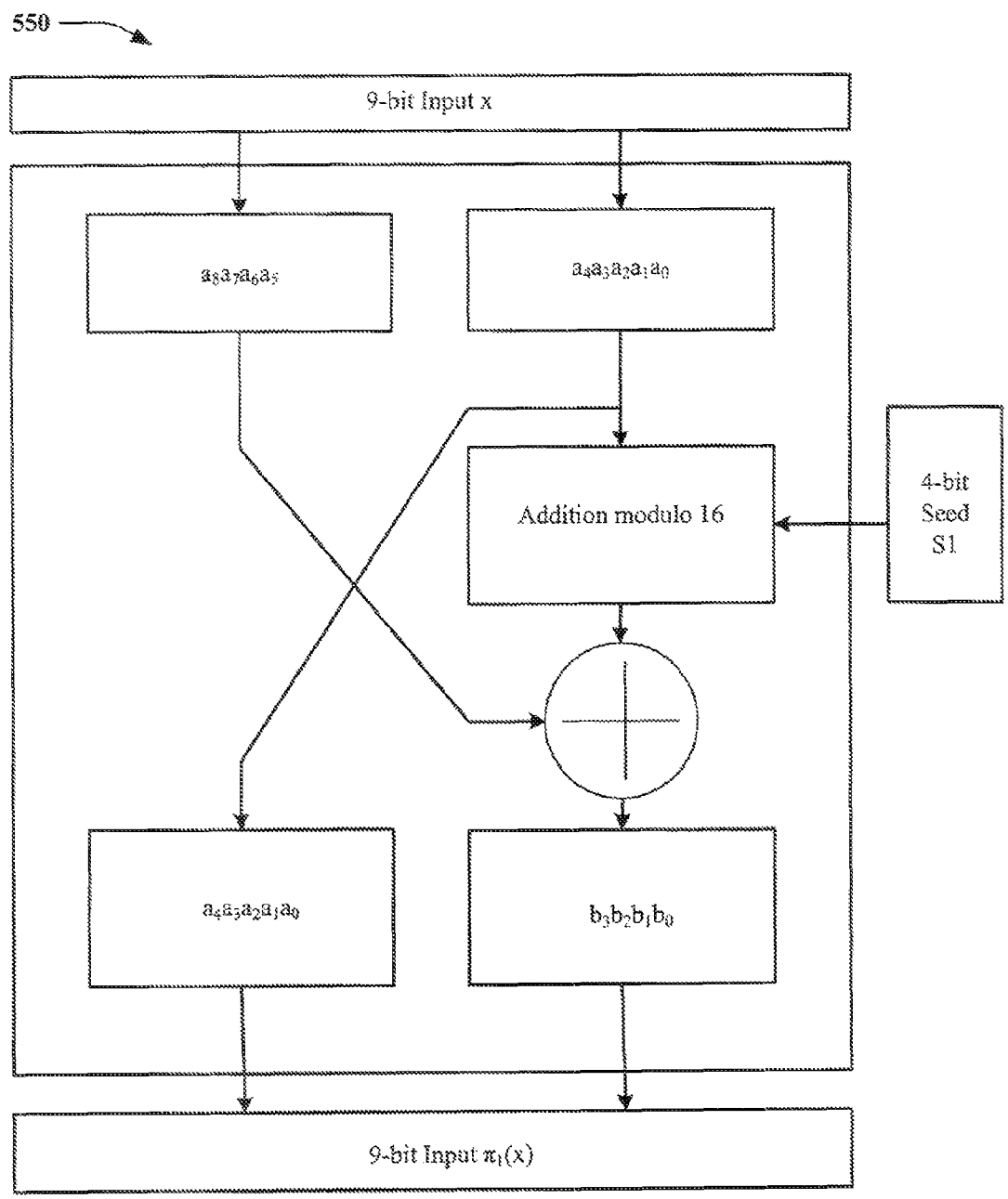
FIG. 5B shows an embodiment of the first Feistel stage 310a for the case in which n=9.

FIG. 5B shows a schematic diagram of an embodiment 550 of the first Feistel stage 510a for the case in which n=9. Stages 510b and 510c can be implemented in a manner similar to the stage 410a. FIGS. 5A and 5B show some examples of Feistel networks. Other modifications are possible. For example, varying the number of stages in FIG. 5A to 2 or 4 instead of 3 or employing a multiplication with a prime modulo another prime or any other algebraic function instead of "addition modulo 16" in FIG. 5B etc.

Figure 6:
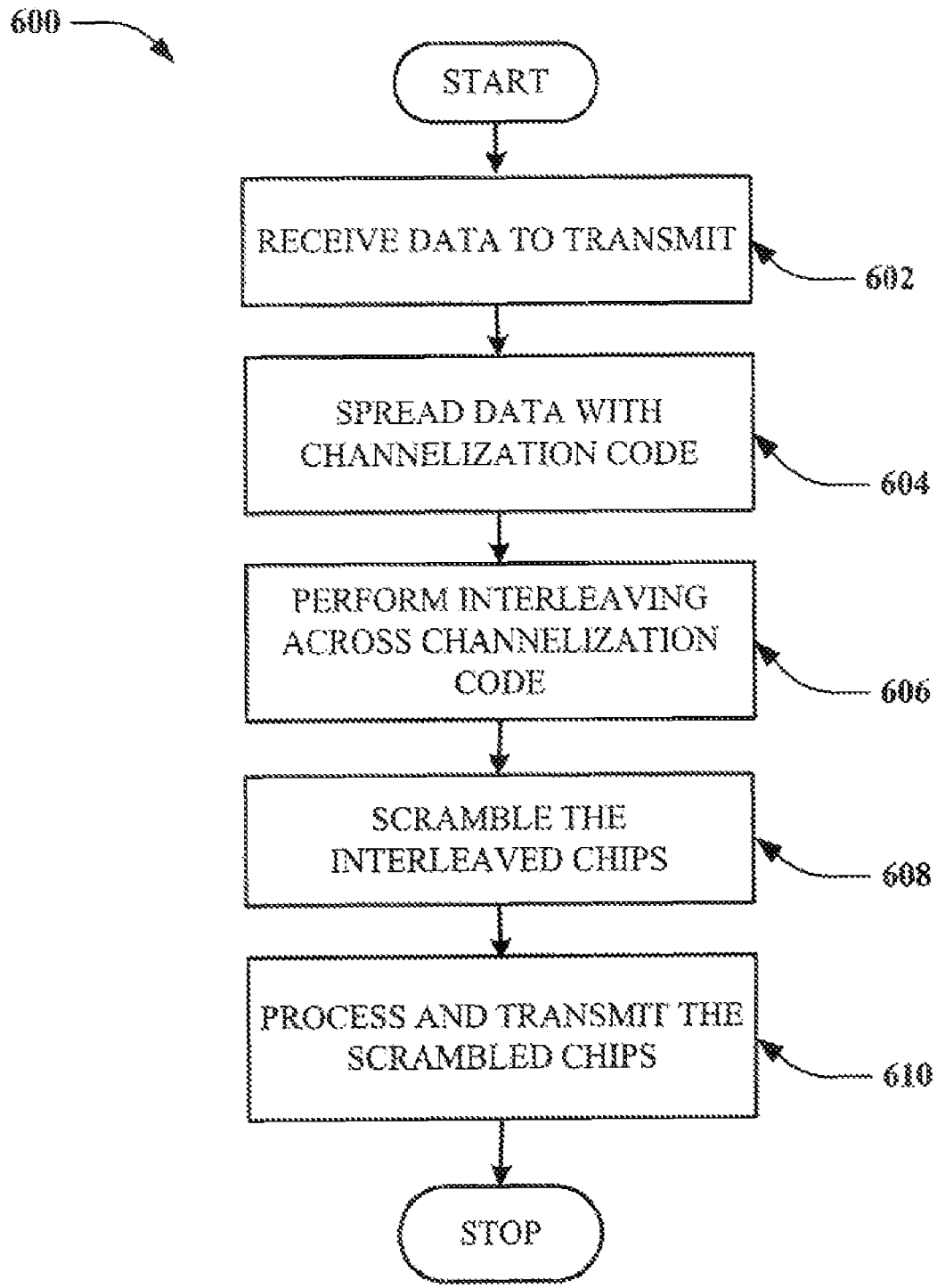
FIG. 6 shows a transmission method in accordance with an aspect.

FIG. 6 shows a method 600 of reducing false alarms within the communication systems in accordance with an aspect. Initially, the data to be transmitted is received at 602. At 604, the received data is spread with a channelization code which uses more bandwidth than the message signal. The chips from the sequence obtained upon spreading are interleaved at 606. As stated supra, any of the pseudo-random or structured interleaving methods can be used. At 608 the interleaved bits are scrambled using a PN sequence. The PN sequence can be a combination of short PN sequence associated with a particular base station and a long PN sequence that identifies a user. At 610 the scrambled chips are further processed for example, filtered, amplified and radiated.

Figure 7:
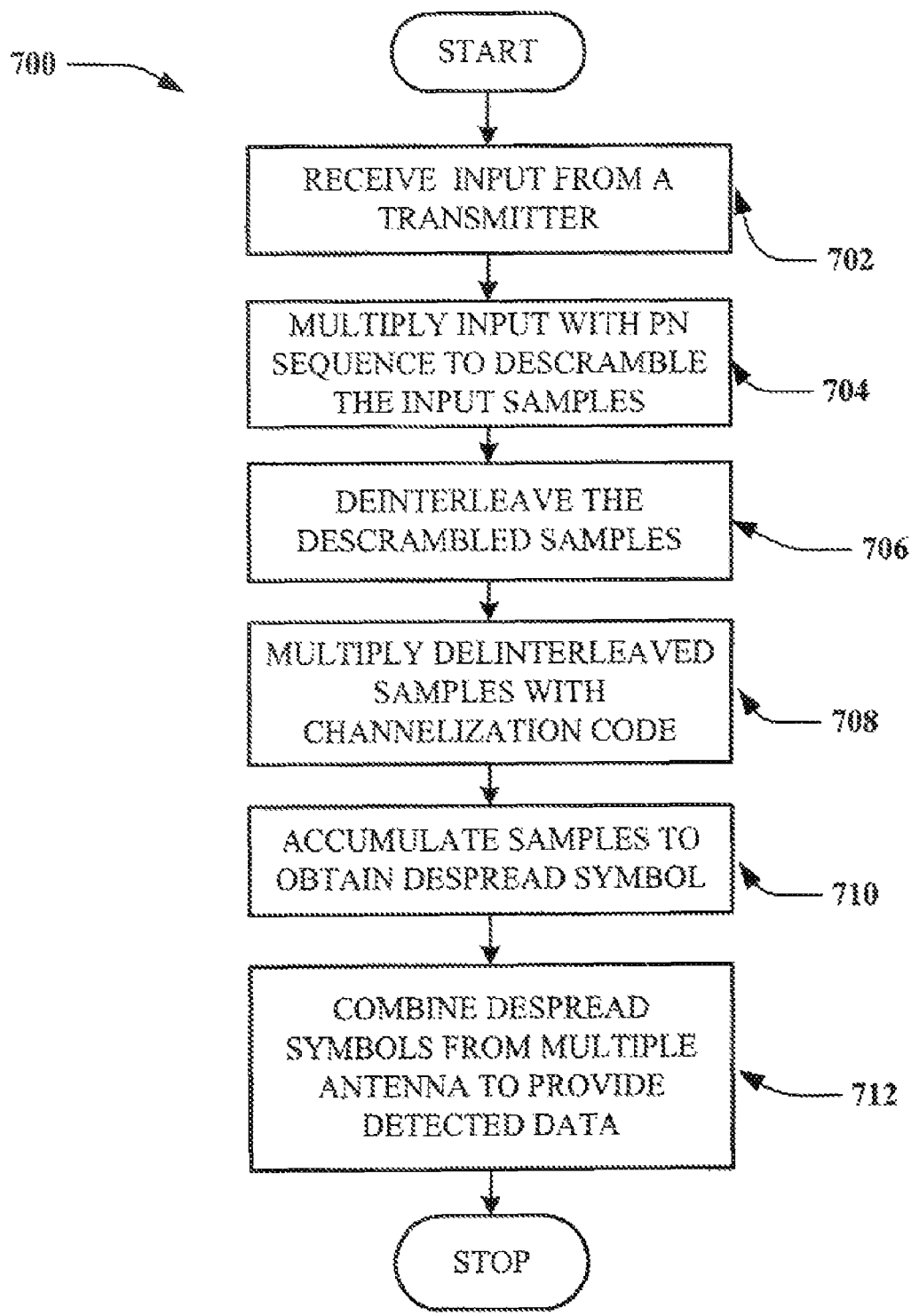
FIG. 7 shows a method of receiving signals that reduces false alarms within the communication systems in accordance with an aspect.

FIG. 7 illustrates a method 700 implemented at a receiver that can receive and decode data transmitted in accordance with the method described in FIG. 6. At 702, input processed in accordance with the method described earlier is received from a transmitter. At 704, the received input is descrambled by multiplying with associated PN sequence. At 706, the descrambled input is deinterleaved. While the deinterleaved samples may contain phase errors due to Doppler, the interleaving method described above shuffles the phase ramp across the interleaved chips hence mitigating false alarms at the receiver. Subsequently, the deinterleaved samples are despread. At 708, the deinterleaved samples are multiplied with the appropriate channelization code and accumulated at 710 to obtain a despread symbol. At 712, the despread symbols so obtained are combined for all receive antennas and the resultant symbol is provided as detected data. Thus, the methodology may be used to obtain detected data from interleaved input signals which are spread utilizing any of the orthogonal codes.

Figure 8:
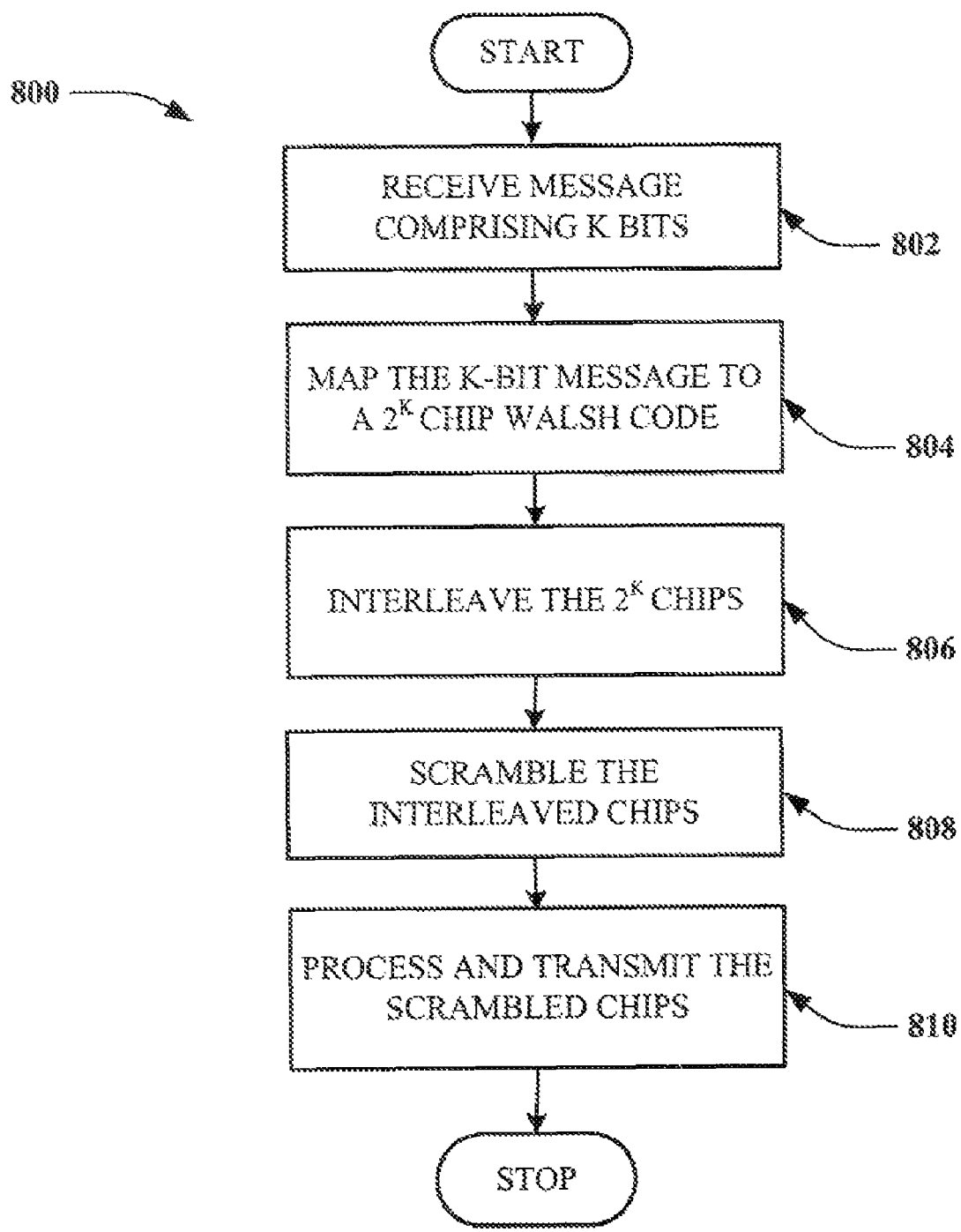
FIG. 8 illustrates a method of transmitting signals whereby false alarms introduced due to Doppler are mitigated.

Turning now to FIG. 8, a method 800 of transmitting signals is illustrated whereby false alarms introduced due to Doppler caused by a moving transmitter/receiver are mitigated. At 802, a message comprising K bits of information is received for transmission. The message can be associated with a voice transmission, video transmission, data transmission or a combination thereof. The K-bit message is now mapped to a specific $2^K$ chip Walsh code at 804. At 806, the $2^K$ chips of the Walsh code are interleaved to produce $2^K$ interleaved chips. The interleaving can be pseudo random interleaving wherein symbols are interleaved in a pseudo random manner so that without knowing the formula originally applied to interleave the symbols it would not be possible to obtain the message within them. The symbols may also be interleaved in a structured manner. At 808, the interleaved chips are multiplied with an appropriate PN sequence as described in detail supra. At 810, the scrambled chips are further processed for example, filtered, upconverted and transmitted as communication signals from an antenna (not shown).

If the Walsh code were transmitted from a moving transmitter without interleaving, a phase ramp is introduced into the signal due to the Doppler shift. Both Doppler shift and Walsh sequencing are multiplicative effects. Therefore, if a set of vectors such as a structured Walsh sequence is affected by a multiplicative Doppler shift it becomes closed in the Euclidean space. As a result, a specific transmitted Walsh code would appear as a different Walsh code at the receiver thereby raising false alarm rates. On the other hand, interleaving a Walsh sequence prior to transmission would shuffle the code bits within the sequence. Transmitting such shuffled sequences breaks the structure causing the false alarms. This is because the phase error introduced into the Walsh sequence is now scattered within the shuffled bits rather than cause a multiplicative effect across consecutive chips of the Walsh sequences which resulted in a transmitted Walsh code appearing as a different Walsh code at the receiver end. Upon reception the shuffled Walsh codes are rearranged to obtain the original transmitted Walsh sequence as described in further detail infra.

Figure 9:
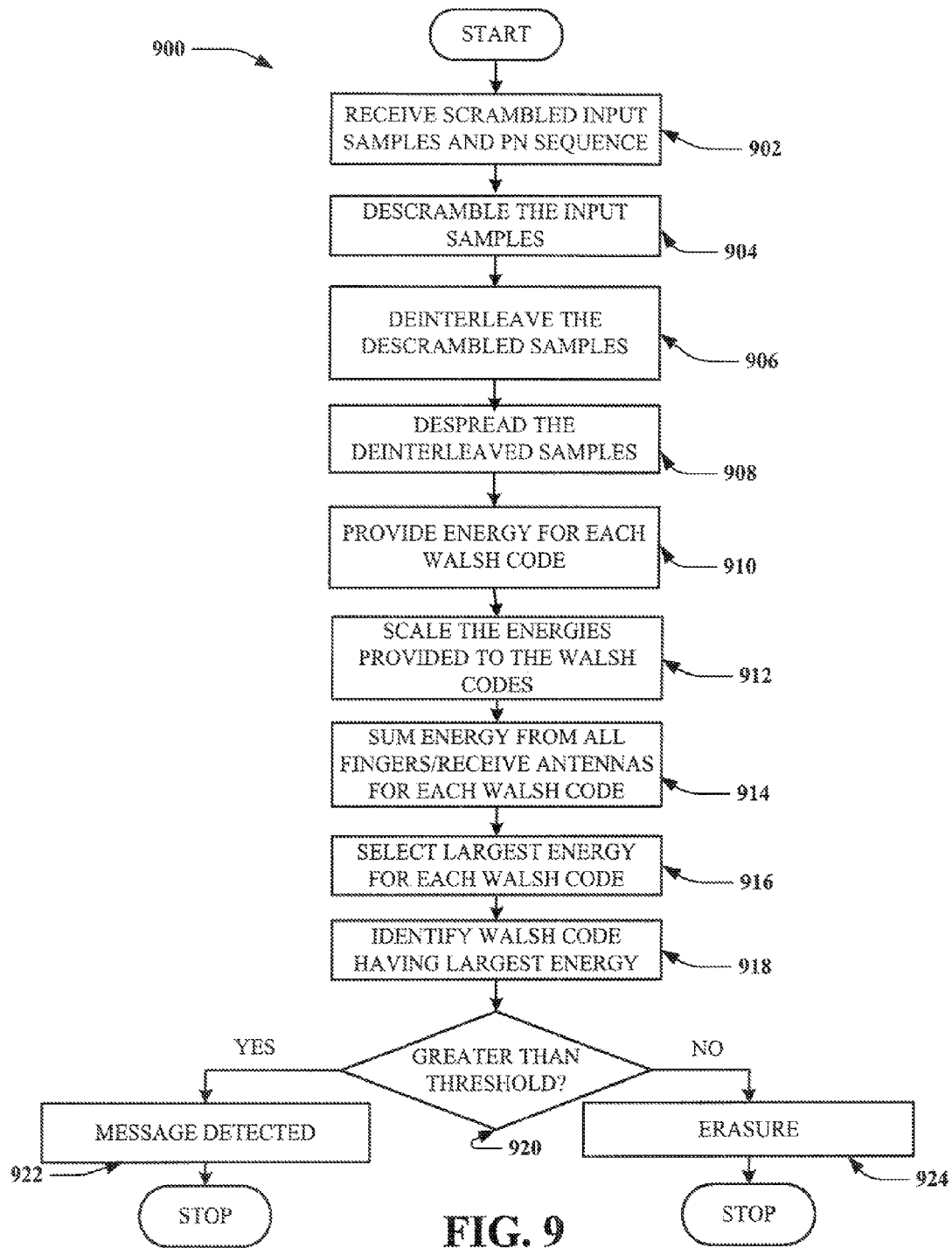
FIG. 9 is a method of receiving and processing signals in accordance with another aspect.

FIG. 9 describes is a methodology 900 in order to obtain a message transmitted within an interleaved Walsh sequence. At 902, the scrambled input samples and the PN sequence are received from a transmitter. As stated supra, the signals can be received via multiple signal paths and/or one or more receive antennas. Upon filtering and downconversion the scrambled input samples are descrambled by removing the PN code applied to the Walsh sequences at step 904. At 906 the descrambled Walsh codes are deinterleaved to obtain the original Walsh sequences. The Walsh sequences so obtained may comprise phase errors introduced by the Doppler. Nevertheless, the Walsh sequence detected at the receiver would still be the transmitted Walsh code since the phase ramp was scattered by interleaving the chips of the Walsh sequence. At 908, the deinterleaved samples are despread using commercially available hardware implementing FHT (Fast Hadamard Transform). At 910, the energies are provided for each of the Walsh codes. The energy provided would generally correspond to the likelihood that the Walsh code is the transmitted code. At 912, the energies are scaled to remove noise etc. At 914 the energies for each Walsh code from all the receive antennas or multiple signal paths are summed. At 916, the largest energy value for each Walsh code is obtained. Alternate embodiments can omit step 914 and instead largest energy value is selected at 916 from among the energies provided to each Walsh code by the multiple receive antennas/signal paths. At 918, the energy values for all the Walsh codes are compared and the Walsh code with a maximum energy value is identified. At 920, the energy value of the Walsh code identified at 918 is compared to a threshold. The threshold can be determined based on criteria discussed above. If the energy value is greater than the threshold then the data associated with the identified Walsh code is declared as the received message at 922 else an erasure is declared at 924.

The techniques described herein may be used for various data and control channels. In an embodiment, the techniques may be used for reverse link (RL) control channels such as Channel Quality Indicator Channel (CQICH), a Request Channel (REQCH), a Pilot Channel (PICH), an Acknowledgement Channel (ACKCH), a Beamforming Feedback Channel (BFCH), a Subband Feedback Channel (SFCH), and so on, which may be processed and transmitted. The techniques can also be used for a time division multiplexed (TDM) pilot that is spread with a channelization code and scrambled. The same interleaver can be used for all channels/users (MACIDs) on the RL CDMA control segment so that an AP (Access Point) receiver needs to perform only one de-interleaving operation.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. An apparatus to mitigate false alarms due to erroneous identification of Doppler time-shifted data as correct data within a communication system, the apparatus comprising:
   at least one processor configured to receive a message comprising K number of bits to be transmitted to a receiver, map the message to one of a plurality of structured codes, each of the structured codes having a length of at least $2^K$, that is determined based on the message length to obtain a sequence of at least $2^K$ chips that corresponds to the message value, and interleave the sequence of at least $2^K$ chips prior to transmission; and
   a memory coupled to the at least one processor.

2. The apparatus of claim 1, wherein the plurality of structured codes are orthogonal codes.

3. The apparatus of claim 1, wherein the plurality of structured codes are Walsh codes.

4. The apparatus of claim 1, wherein the at least one processor implements a Feistel network to interleave the sequence of chips in a pseudo-random manner.

5. The apparatus of claim 1, wherein the at least one processor interleaves the sequence of chips commonly across one or more of channels or users.

6. The apparatus of claim 1, wherein the at least one processor interleaves the sequence of chips across a length associated with each of the plurality of structured codes.

7. The apparatus of claim 1, wherein the at least one processor scrambles the sequence of chips after interleaving.

8. The apparatus of claim 1, wherein the at least one processor scrambles the sequence of chips prior to interleaving.

9. An apparatus to mitigate false alarms due to erroneous identification of Doppler time-shifted data as correct data within a communication system, the apparatus comprising:
   at least one processor configured to receive a sequence of at least $2^K$ samples that were transmitted from a transmitter, deinterleave the sequence of at least $2^K$ samples to obtain a sequence of at least $2^K$ deinterleaved samples, despread the sequence of at least $2^K$ deinterleaved samples with each of a plurality of structured codes, determine energy for each of the plurality of structured codes, and provide one of the plurality of structured codes with largest determined energy as a detected message, wherein the detected messages comprises K number of bits; and
   memory coupled to the at least one processor.

10. The apparatus of claim 9, wherein the structured codes are Walsh codes.

11. The apparatus of claim 9, wherein the at least one processor is configured to deinterleave the sequence of samples in at least one of a pseudo-random manner or a structured manner, the manner being complementary to interleaving performed by the transmitter.

12. An apparatus to mitigate false alarms due to erroneous identification of Doppler time-shifted data as correct data within a communication system, the apparatus comprising:
    a memory that retains instructions for receiving a message comprising K number of bits to be transmitted to a receiver, mapping the message to one of a plurality of structured codes, each of the structured codes having a length of at least $2^K$, that is determined based on the message length to obtain a sequence of at least $2^K$ chips that corresponds to the message value, and interleaving the sequence of at least $2^K$ chips prior to transmission; and
    a processor coupled to the memory configured to execute the instructions retained in the memory.

13. The apparatus of claim 12, wherein mapping the message to one of a plurality of structured codes comprises mapping the message to one of a plurality of Walsh codes, wherein the structured codes are Walsh codes, and wherein the sequence of chips is one of the Walsh codes.

14. The apparatus of claim 12, wherein interleaving the sequence of chips comprises interleaving the sequence of chips across a length associated with each of the plurality of structured codes.

15. An apparatus to mitigate false alarms due to erroneous identification of Doppler time-shifted data as correct data within a communication system, the apparatus comprising:
    a memory that retains instructions for receiving a sequence of at least $2^K$ samples that were transmitted from a transmitter, deinterleaving the sequence of at least $2^K$ samples to obtain a sequence of at least $2^K$ deinterleaved samples, despreading the sequence of at least $2^K$ deinterleaved samples with each of a plurality of structured codes, determining energy for each of the plurality of structured codes, and providing one of the plurality of structured codes with largest determined energy as a detected message, wherein the message comprises K number of bits; and
    a processor coupled to the memory configured to execute the instructions retained in the memory.

16. The apparatus of claim 15, wherein deinterleaving the sequence of samples comprises deinterleaving the sequence of samples across a length associated with each of the plurality of structured codes.

17. The apparatus of claim 15, wherein the structured codes are Walsh codes.

18. An apparatus to mitigate false alarms due to erroneous identification of Doppler time-shifted data as correct data within a communication system, the apparatus comprising:
    means for receiving a message comprising K number of bits to be transmitted to a receiver;
    means for mapping the message to one of a plurality of structured codes of length equal to at least $2^K$ that is determined based on the message length to obtain a sequence of at least $2^K$ chips; and means for interleaving the sequence of at least $2^K$ chips prior to transmission.

19. The apparatus of claim 18, wherein the means for mapping the message to one of a plurality of structure codes comprises means for mapping the message to one of a plurality of Walsh codes, wherein the structured codes are Walsh codes, and wherein the sequence of chips is one of the Walsh codes.

20. The apparatus of claim 18, wherein the means for interleaving the sequence of chips comprises means for interleaving the sequence of chips across a length associated with each of the plurality of structured codes.

21. The apparatus of claim 18, wherein the means for interleaving the sequence of chips interleaves the chips commonly for one or more of channels or users.

22. An apparatus to mitigate false alarms due to erroneous identification of Doppler time-shifted data as correct data within a communication system, the apparatus comprising:
means for receiving a sequence of at least $2^K$ samples that were transmitted from a transmitter;
means for deinterleaving the sequence of at least $2^K$ samples to obtain a sequence of at least $2^K$ deinterleaved sample;
means for despreading the sequence of at least $2^K$ deinterleaved samples with each of a plurality of structured codes;
means for determining energy for each of the plurality of structured codes; and
means for providing one of the plurality of structured codes with largest determined energy as a detected message, wherein the detected message comprises K number of bits.

23. The apparatus of claim 22, wherein the means for deinterleaving the sequence of samples comprises means for deinterleaving the sequence of samples across a length associated with each of the plurality of structured codes.

24. The apparatus of claim 22, wherein the structured codes are Walsh codes.

25. The apparatus of claim 22, wherein the means for deinterleaving implements a single deinterleaving operation for at least one of a plurality of channels or a plurality of users.

26. A non-transitory computer-readable storage medium to mitigate false alarms due to erroneous identification of Doppler time-shifted data as correct data within a communication system, the computer-readable storage medium comprising instructions that, when executed, cause one or more processors to:
receive a message comprising K number of bits to be transmitted to a receiver;
map the message to one of a plurality of structured codes, each of the structured codes having a length of at least $2^K$, that is determined based on the message length to obtain a sequence of at least $2^K$ chips that corresponds to the message value; and
interleave the sequence of at least $2^K$ chips prior to transmission.

27. The non-transitory computer-readable storage medium of claim 26, wherein the plurality of structured codes are orthogonal codes.

28. The non-transitory computer-readable storage medium of claim 26, wherein the plurality of structured codes are Walsh codes.

29. The non-transitory computer-readable storage medium of claim 26, wherein the sequence of chips is interleaved in a pseudo-random manner using a Feistel network.

30. The non-transitory computer-readable storage medium of claim 26, wherein the sequence of chips is interleaved commonly across one or more of channels or users.

31. The non-transitory computer-readable storage medium of claim 26, wherein the sequence of chips is interleaved across a length associated with each of the plurality of structured codes.

32. The non-transitory computer-readable storage medium of claim 26, further comprising scrambling the sequence of chips after interleaving.

33. The non-transitory computer-readable storage medium of claim 26, further comprising scrambling the sequence of chips prior to interleaving.

34. A non-transitory computer-readable storage medium to mitigate false alarms due to erroneous identification of Doppler time-shifted data as correct data within a communication system, the computer-readable storage medium comprising instructions that, when executed, cause one or more processors to:
receive a sequence of at least $2^K$ samples that were transmitted from a transmitter;
deinterleave the sequence of at least $2^K$ samples to obtain a sequence of at least $2^K$ deinterleaved samples;
despread the sequence of at least $2^K$ deinterleaved samples with each of a plurality of structured codes;
determine energy for each of the plurality of structured codes; and
provide one of the plurality of structured codes with largest determined energy as a detected message. wherein the detected message comprises K number of bits.

35. The non-transitory computer-readable storage medium of claim 34, wherein the structured codes are Walsh codes.

36. The non-transitory computer-readable storage medium of claim 34, wherein the sequence of samples is deinterleaved in at least one of a pseudo-random manner or a structured manner, the manner being complementary to interleaving performed by the transmitter.

* * * * *